(12) United States Patent
Masui et al.

(10) Patent No.: US 12,013,893 B2
(45) Date of Patent: Jun. 18, 2024

(54) INFORMATION PROCESSING APPARATUS INFORMATION PROCESSING METHOD TO SEARCH A MUSIC PIECE FOR REPRODUCTION

(71) Applicant: SONY GROUP CORPORATION, Tokyo (JP)

(72) Inventors: Shintaro Masui, Tokyo (JP); Naoki Shibuya, Tokyo (JP); Keisuke Toyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 26 days.

(21) Appl. No.: 17/756,070

(22) PCT Filed: Nov. 6, 2020

(86) PCT No.: PCT/JP2020/041497
§ 371 (c)(1),
(2) Date: May 16, 2022

(87) PCT Pub. No.: WO2021/100493
PCT Pub. Date: May 27, 2021

(65) Prior Publication Data
US 2022/0391438 A1  Dec. 8, 2022

(30) Foreign Application Priority Data
Nov. 22, 2019  (JP) ................................ 2019-211516

(51) Int. Cl.
*G06F 16/00* (2019.01)
*G06F 16/635* (2019.01)
(Continued)

(52) U.S. Cl.
CPC .......... *G06F 16/636* (2019.01); *G06F 16/639* (2019.01); *G10L 15/08* (2013.01)

(58) Field of Classification Search
CPC .... G06F 16/636; G06F 16/639; G06F 16/638; G06F 16/635; G10L 15/08;
(Continued)

(56) References Cited

U.S. PATENT DOCUMENTS

2019/0149490 A1  5/2019  Tokuchi
2019/0206399 A1*  7/2019  Garmark ................. G11B 27/11

FOREIGN PATENT DOCUMENTS

JP  2003-084783 A  3/2003
JP  2004-246535 A  9/2004
(Continued)

OTHER PUBLICATIONS

International Search Report and Written Opinion of PCT Application No. PCT/JP2020/041497, dated Jan. 19, 2021, 10 pages of ISRWO.

*Primary Examiner* — Jared M Bibbee
(74) *Attorney, Agent, or Firm* — CHIP LAW GROUP

(57) ABSTRACT

The present disclosure relates to an information processing apparatus, an information processing method, and a program enabling to present a feature serving as a reason and a basis of being searched, of a music piece searched in response to a request of a user. A music piece is searched on the basis of a search request of a user, and information is generated, as a response to the search request, in which a feature that is of the searched music piece and corresponds to the search request is expressed by a balloon size for each type of the feature. The present invention can be applied to a music piece agent device.

16 Claims, 10 Drawing Sheets

(51) Int. Cl.
*G06F 16/638* (2019.01)
*G10L 15/08* (2006.01)

(58) Field of Classification Search
CPC ....... G10H 2240/081; G10H 2240/085; G10H 2240/131; G10K 15/04
See application file for complete search history.

(56) References Cited

FOREIGN PATENT DOCUMENTS

| | | | | | |
|---|---|---|---|---|---|
| JP | 2010-049032 | A | | 3/2010 | |
| JP | 2010049032 | A | * | 3/2010 | |
| JP | 2019-091387 | A | | 6/2019 | |
| JP | 2019091387 | A | * | 6/2019 | ....... G06F 17/30654 |

* cited by examiner

INFORMATION PROCESSING APPARATUS INFORMATION PROCESSING METHOD TO SEARCH A MUSIC PIECE FOR REPRODUCTION

CROSS REFERENCE TO RELATED APPLICATIONS

This application is a U.S. National Phase of International Patent Application No. PCT/JP2020/041497 filed on Nov. 6, 2020, which claims priority benefit of Japanese Patent Application No. JP 2019-211516 filed in the Japan Patent Office on Nov. 22, 2019. Each of the above-referenced applications is hereby incorporated herein by reference in its entirety.

TECHNICAL FIELD

The present disclosure relates to an information processing apparatus, an information processing method, and a program, and in particular, relates to an information processing apparatus, an information processing method, and a program capable of presenting a feature serving as a reason and a basis of being searched, of a music piece searched in response to a request of a user.

BACKGROUND ART

With an increase in storage capacity and the spread of networks, it has become possible to reproduce a huge amount of music pieces (contents) by using terminal devices represented by smartphones and the like.

However, since the information is excessive, it has been difficult for a user to find a known music piece (content) when trying to reproduce.

Furthermore, for unknown music pieces, the user cannot even perform searching. Therefore, even if there are a large number of reproducible music pieces, the user cannot make full use.

Therefore, there has been proposed a technique of searching for and recommending music pieces by content-based type filtering processing or collaborative filtering type filtering processing in response to a user's request.

Moreover, there has been proposed a technique of presenting (recommending), to a user, a music piece corresponding to an emotional state for a music piece designated by the user and desired to be reproduced, by searching for the music piece on the basis of an analysis result of biological information prior to reproduction of the music piece, from a database in which an identifier of the music piece and the biological information or the analysis result of the biological information are registered in advance in association with each other (see Patent Document 1).

CITATION LIST

Patent Document

Patent Document 1: Japanese Patent Application Laid-Open No. 2004-246535

SUMMARY OF THE INVENTION

Problems to be Solved by the Invention

However, in any of the content-based type filtering processing, the collaborative filtering type filtering processing, and the processing using the technology described in Patent Document 1, a basis and a reason that the music piece has been searched are not presented to the user.

For this reason, the user is to reproduce the music piece that has been searched or recommended in a state where the user cannot well understand the reason and the basis of being searched or recommended. Therefore, there have been cases where the music piece cannot be reproduced in a state where the user is sufficiently satisfied with the searched or recommended music piece.

The present disclosure has been made in view of such a situation, and in particular, an object is to be able to present a reason and a basis of being searched, for a music piece searched in response to a request of a user.

SOLUTIONS TO PROBLEMS

An information processing apparatus and a program according to one aspect of the present disclosure are an information processing apparatus and a program including: a search unit configured to search for a music piece on the basis of a search request of a user; and a response generation unit configured to generate, as a response to the search request, a search result including information expressing a feature that is of the music piece searched by the search unit and corresponds to the search request.

An information processing method according to one aspect of the present disclosure is an information processing method including steps of: searching for a music piece on the basis of a search request of a user; and generating, as a response to the search request, a search result including information expressing a feature that is of the searched music piece and corresponds to the search request.

In one aspect of the present disclosure, a music piece is searched on the basis of a search request of a user; and a search result including information expressing a feature that is of the searched music piece and corresponds to the search request is generated as a response to the search request.

MODE FOR CARRYING OUT THE INVENTION

Figure 1:
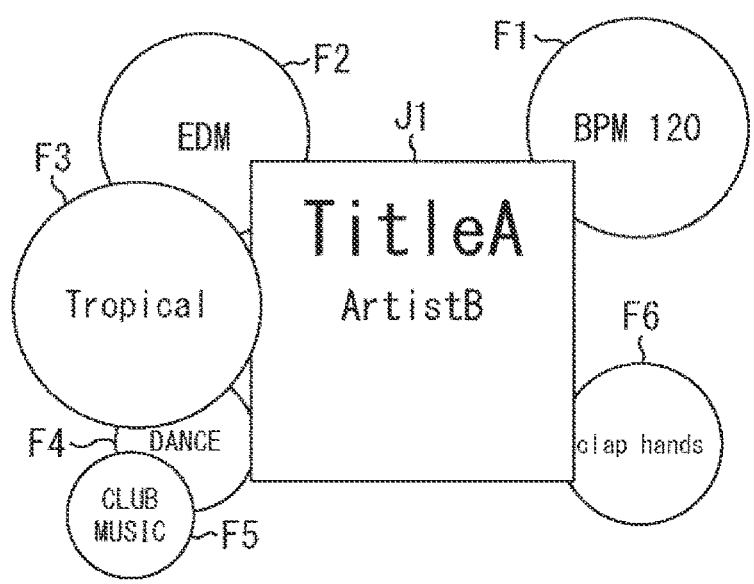
FIG. 1 is a diagram for explaining an outline of the present disclosure.

Hereinafter, a preferred embodiment of the present disclosure will be described in detail with reference to the accompanying drawings. Note that, in this specification and the drawings, components having substantially the same functional configuration are denoted by the same reference numerals, and redundant explanations are omitted.

Hereinafter, an embodiment for implementing the present technology will be described. The description will be given in the following order.

1. Outline of present disclosure
2. Preferred embodiment
3. Example of execution by software

1. Outline of Present Disclosure

The present disclosure makes it possible to present a feature serving as a reason and a basis for a music piece searched in response to a request of a user.

First, an outline of the present disclosure will be described.

Conventionally, in searching for a music piece, a music piece has been searched by content-based type filtering processing or collaborative filtering type filtering processing.

Here, the content-based type filtering processing is processing of filtering (estimating) a music piece on the basis of information on a preference of a user, such as an artist, a music piece title, lyrics, a label, a release time, a genre, tempo, chord progression, a used musical instrument, and a movie theme song.

More specifically, in the content-based type filtering processing, for example, when information on a preference of the user, which is to be a request of the user, such as "fond of a music piece of 2000s, fond of EDM", is obtained, a music piece that matches (conforms to) this condition is to be searched.

Furthermore, the collaborative filtering type filtering processing is processing of searching for a music piece that is often reproduced by a user B who reproduces the same music piece as a reproduction history of a user A.

More specifically, for example, in a case where the user A reproduces a music piece aaa and a music piece bbb, and the user B reproduces the music piece aaa, the music piece bbb, and a music piece ccc, the music piece reproduced by the user A is included in the music piece reproduced by the user B, so that the users A and B are considered to have similar preferences, in the collaborative filtering type filtering processing. Therefore, for the user A, the music piece ccc reproduced by the user B is to be searched.

Moreover, in the technique of Patent Document 1, prior to reproduction of a music piece, a music piece corresponding to an emotional state for a music piece designated by a user and desired to be reproduced is presented to the user, by searching for the music piece on the basis of an analysis result of biological information from a database in which an identifier of the music piece and the biological information or the analysis result of the biological information are registered in advance in association with each other.

However, in either case, the user is not presented with what reason the searched music piece has been searched.

Therefore, for example, in a case where a music piece intended to be reproduced by the user is not searched, a reason and a basis of the search cannot be well understood. Therefore, it is not possible to recognize what kind of request as feedback should be made in order to further search for the music piece intended to be reproduced by the user.

As a result, since the user cannot appropriately provide feedback for further searching for the music piece intended to be reproduced by the self, the user cannot efficiently search for the music piece intended to be reproduced by the self.

Therefore, in the present disclosure, the user is made to easily recognize a reason and a basis that a music piece has been searched, by presenting a feature serving as the reason and the basis that the music piece has been searched.

As a result, even in a case where a music piece intended to be reproduced is not searched, the user can feed back a request for searching for the music piece desired by the self, on the basis of the feature that is of the searched music piece and serves as the reason and the basis of being searched.

As a result, it becomes possible to efficiently search for a music piece intended to be reproduced by the user.

More specifically, in the present disclosure, for example, in a case where the user's request is "exciting music", a music piece to be searched is presented as illustrated in FIG. 1.

In FIG. 1, the searched music piece is presented as a jacket J1, and balloons F1 to F6 are presented as elements serving as features of the music piece.

In the jacket J1, "Title A" is written in an upper part to indicate that the title of the searched music piece is "Title A", and "Artist B" is written in a lower part to indicate that the artist of the searched music piece is "Artist B".

Furthermore, the circular balloons F1 to F6 are provided around the jacket J1, and each of them expresses a feature of the searched music piece and a size thereof.

That is, the balloon F1 is written with "BPM 120" to indicate that beats per minute (BPM) of the searched music piece is 120.

Furthermore, the balloon F2 is written with "EDM" to indicate that a genre of the searched music piece is included in electronic dance music (EDM).

Moreover, the balloon F3 is written with "Tropical" to indicate that a genre of the searched music piece is included in tropical (a music piece having a feel of a tropical region).

Furthermore, the balloon F4 is written with "DANCE" to indicate that a genre of the searched music piece is included in dance music.

Moreover, the balloon F5 is written with "CLUB MUSIC" to indicate that a genre of the searched music piece is included in club music.

The balloon F6 is written with "clap hands" to indicate that a genre of the searched music piece is included in a genre of exciting music with handclaps.

As described above, even one music piece may belong to a plurality of genres.

However, even in a case where one music piece belongs to a plurality of genres, there may be many features of a specific genre and few features of other specific genres, and the features of individual genres are not uniformly provided in many cases even when one music piece belongs to a plurality of genres.

Therefore, in the present disclosure, even in a case of belonging to a plurality of genres, the number or magnitude of features of each genre is expressed by a size of the balloon to present what music piece having what kind of features the searched music piece is.

That is, in the case of FIG. 1, the balloon F3 is the largest balloon, which indicates that the largest feature (genre) of the searched music piece is a feature of a tropical music piece (a music piece having a feel of a tropical region).

Furthermore, the balloons F1 and F2 are the second largest after the balloon F3, which indicates that the second features of the searched music piece are the BPM being 120 and the genre being included in EDM.

Moreover, it is indicated that the searched music piece includes features of being included in dance music, club music, and a genre including elements exciting with handclaps, as the fourth and subsequent features.

As illustrated in FIG. 1, by presenting the feature of the searched music piece and the size of the feature, the user can recognize the feature serving as a reason and a basis of being searched.

As a result, in a case where the searched music piece is the music piece intended by the self, it is possible to reproduce the searched music piece after understanding well and being satisfied with the feature serving as the reason and the basis that the music piece has been searched.

Furthermore, in a case where the searched music piece is not the music piece intended by the self, it is possible to consider such feedback to allow the music piece intended by the self to be searched, on the basis of the feature included in the music piece and serving as the reason and the basis that the music piece has been searched and on the basis of the size of the feature.

That is, in a case where, as the music piece intended by the user, a music piece having a feature as dance music is desired rather than a feature of being tropical (a feature of a music piece having a feel of a tropical region), it is possible to facilitate the search for the music piece intended by the self, by feeding back a request such as "more danceable!".

Furthermore, in a case where a music piece in which BPM of the music piece intended by the user is faster than 120 is desired, it is possible to facilitate the search for the music piece intended by the self by feeding back a request such as "more up-tempo!".

As a result, in the present disclosure, in a case where the intended music piece has been searched, by presenting information that allows recognition of the feature serving as the reason and the basis of the searched music piece, the music piece searched by the user can be reproduced in a state where the user is satisfied. Furthermore, in a case where unintended music piece has been searched, appropriate feedback can be given, and the music piece intended by the user can be efficiently searched.

2. Preferred Embodiment

Configuration Example of Information Processing Apparatus of Present Disclosure

Next, a hardware configuration example of an information processing apparatus according to the present disclosure will be described with reference to a block diagram in FIG. 2.

The information processing apparatus of the present disclosure is, for example, a smartphone or a tablet.

Figure 2:
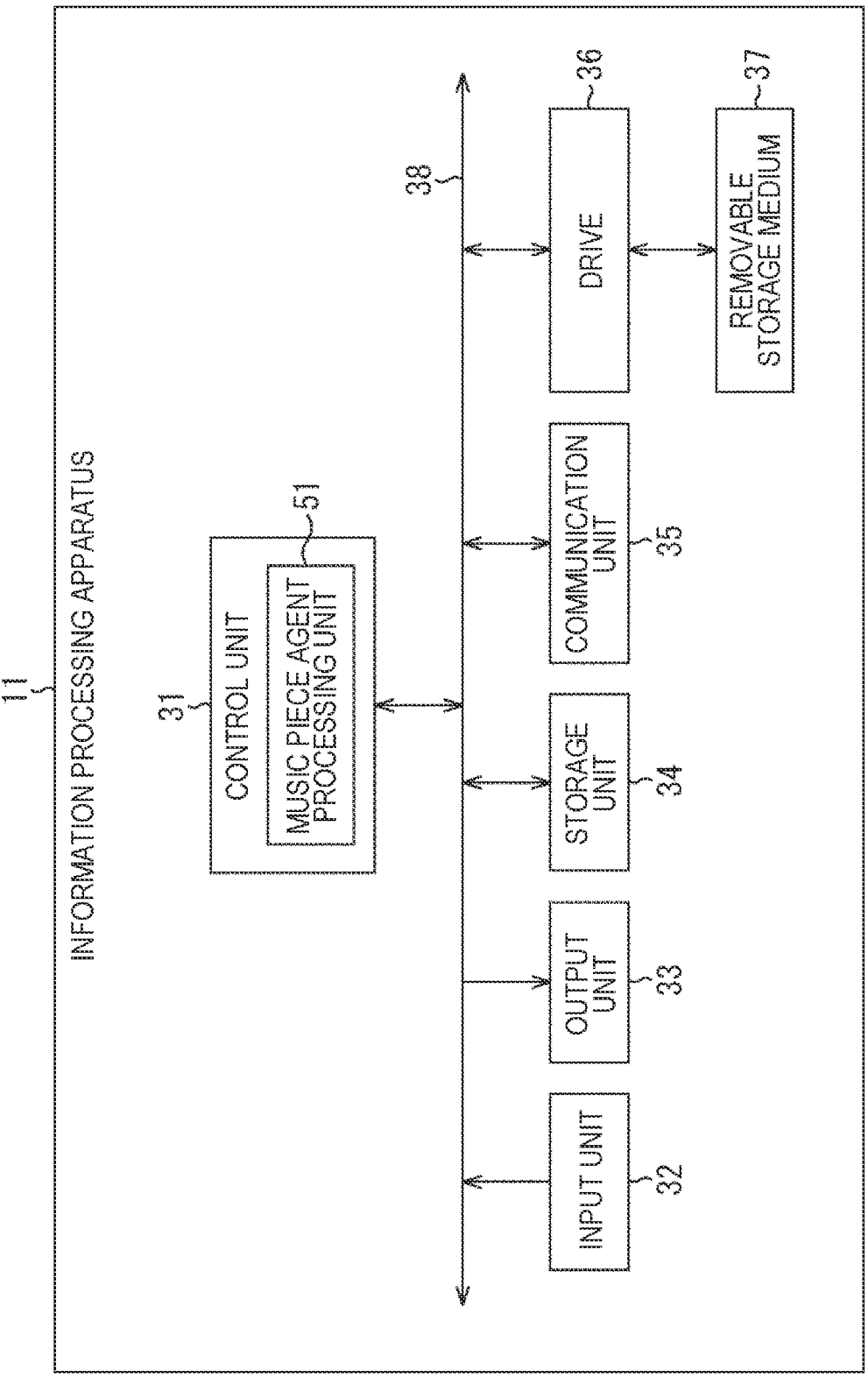
FIG. 2 is a diagram for explaining a configuration example of hardware of an information processing apparatus of the present disclosure.

An information processing apparatus 11 of FIG. 2 includes a control unit 31, an input unit 32, an output unit 33, a storage unit 34, a communication unit 35, a drive 36, and a removable storage medium 37, which are connected to each other via a bus 38 and can transmit and receive data and programs.

The control unit 31 includes a processor and a memory, and controls the entire operation of the information processing apparatus 11.

Furthermore, the control unit 31 includes a music piece agent processing unit 51.

The music piece agent processing unit 51 searches for a music piece content stored in a server or the like on a network (not illustrated) via the storage unit 34 or the communication unit 35, in response to a request of the user inputted via the input unit 32, and the music piece agent processing unit 51 outputs a music piece as a search result from the output unit 33.

Figure 3:
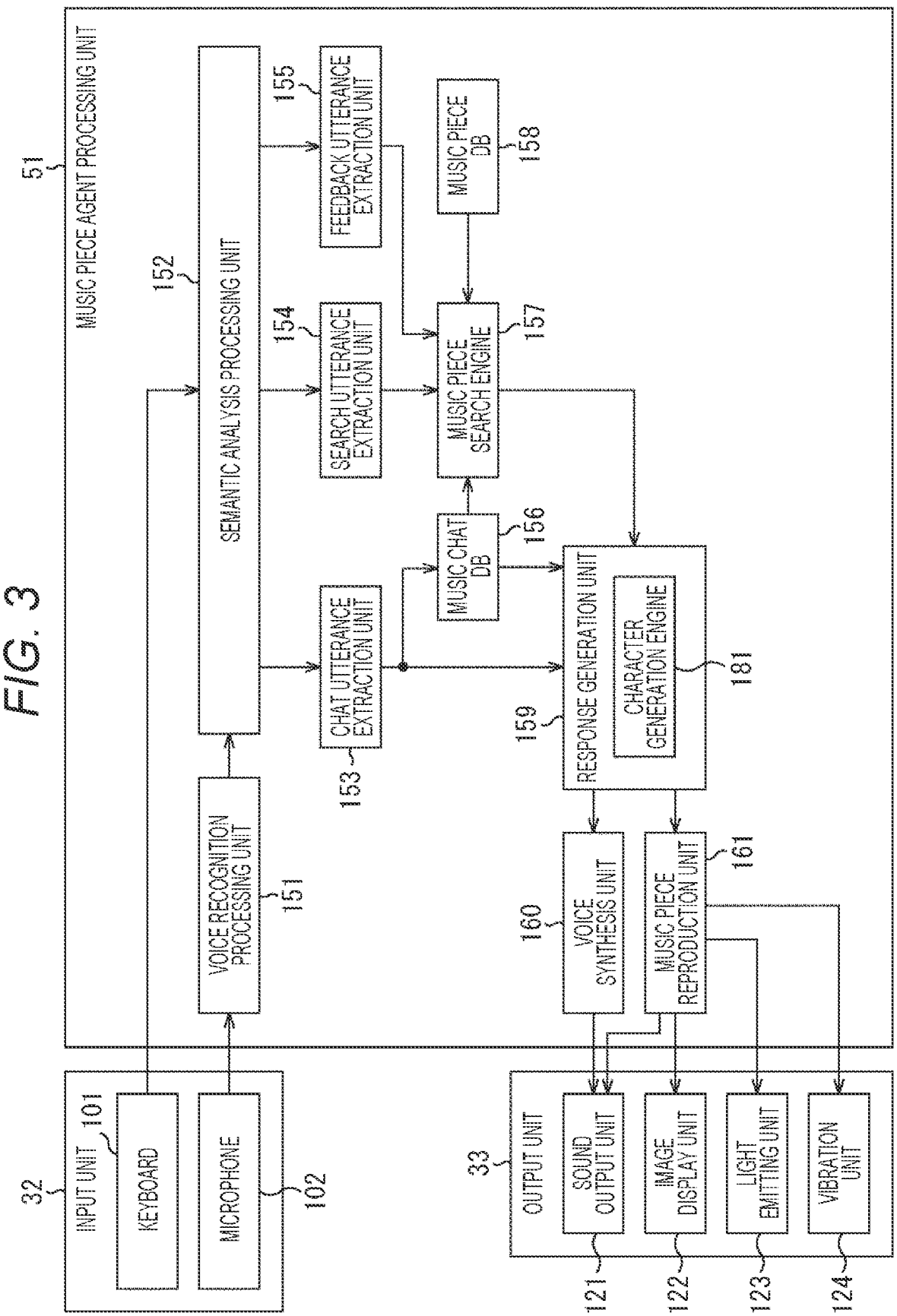
FIG. 3 is a diagram for explaining a configuration example of a music piece agent processing unit.

Note that a detailed configuration of the music piece agent processing unit 51 will be described later with reference to FIG. 3.

The input unit 32 includes an input device such as a keyboard with which the user inputs an operation command or a microphone with which the user inputs an operation command by voice, and supplies various input signals to the control unit 31.

The output unit 33 includes: a sound output unit 121 (FIG. 3) including a speaker and the like; an image display unit 122 (FIG. 3) including a liquid crystal display (LCD), an organic electro-luminescence (EL), or the like; a light emitting unit 123 (FIG. 3) including a light emitting diode (LED) or the like; and a vibration unit 124 (FIG. 3) including a vibrator. The output unit 33 is controlled by the control unit 31 to display various search results and reproduce a searched music piece.

The storage unit 34 includes a hard disk drive (HDD), a solid state drive (SSD), a semiconductor memory, or the like, and is controlled by the control unit 31 to write or read various data including content data and programs.

The communication unit 35 is controlled by the control unit 31 to transmit and receive various data and programs to and from various devices via a communication network represented by a local area network (LAN) or the like in a wired (or wireless (not illustrated)) manner.

The drive 36 reads and writes data from and to the removable storage medium 37 such as a magnetic disk (including a flexible disk), an optical disk (including a compact disc-read only memory (CD-ROM) and a digital versatile disc (DVD)), a magneto-optical disk (including a mini disc (MD)), or a semiconductor memory.

Configuration Example of Music Piece Agent Processing Unit

Next, a function of the music piece agent processing unit 51 implemented by the control unit 31 will be described with reference to a functional block diagram of FIG. 3.

The music piece agent processing unit 51 includes a voice recognition processing unit 151, a semantic analysis processing unit 152, a chat utterance extraction unit 153, a search utterance extraction unit 154, a feedback utterance extraction unit 155, a music chat database (DB) 156, a music piece search engine 157, a music piece database (DB) 158, a response generation unit 159, a voice synthesis unit 160, and a music piece reproduction unit 161.

The voice recognition processing unit 151 performs voice recognition processing on the basis of voice collected by a microphone 102 in the input unit 32, converts user's utterance into text information, and outputs to the semantic analysis processing unit 152.

The semantic analysis processing unit 152 analyzes a meaning of an utterance content by, for example, morphological analysis or the like, on the basis of text information inputted by operating a keyboard 101 of the input unit 32 and text information that is a result of voice recognition processing related to utterance supplied from the voice recognition processing unit 151.

Then, the semantic analysis processing unit 152 outputs an analysis result of the utterance content to the chat utterance extraction unit 153, the search utterance extraction unit 154, and the feedback utterance extraction unit 155.

Note that, hereinafter, the description will be made on assumption that text information that is inputted from the keyboard 101 operated by the user is text information that is a result of voice recognition processing of utterance uttered by the user as voice.

Therefore, hereinafter, the text information based on the analysis result of the utterance content also includes text information inputted by operating the keyboard 101.

The chat utterance extraction unit 153 extracts chat utterance from the utterance content recognized from the text information supplied from the semantic analysis processing unit 152, supplies the chat utterance to the response generation unit 159, and causes the music chat DB 156 to accumulate.

The search utterance extraction unit 154 extracts utterance for searching for a music piece, that is, search utterance, from the utterance content recognized from the text information supplied from the semantic analysis processing unit 152, and supplies the search utterance to the music piece search engine 157.

The feedback utterance extraction unit 155 extracts feedback utterance for the search result from the utterance content recognized from the text information supplied from the semantic analysis processing unit 152, and supplies the feedback utterance to the music piece search engine 157.

Here, the chat utterance, the search utterance, and the feedback utterance will be described.

The search utterance is an utterance content instructing search for a music piece, in an utterance content. More specifically, the search utterance is utterance that specifies meta information including detailed information of a music piece, and for example, is utterance instructing search for the music piece by specifying an artist, a music piece title, lyrics, a label, a release time, a genre, tempo, chord progression, a used musical instrument, whether or not it is a movie theme song, or the like.

Furthermore, the search utterance includes utterance instructing a feature of the music piece to be searched, such as a happy music piece, a cheerful music piece, a sad music piece, and an exciting music piece.

The feedback utterance is utterance for a search result based on the search utterance.

The feedback utterance is utterance for further instructing search for a music piece, for example, with respect to a music piece as a search result, by designating information as a difference on the basis of the music piece as the search result, such as a more up-tempo music piece or a more exciting music piece.

Furthermore, the feedback utterance also includes utterance of an instruction for reproduction, an instruction for stop after start of the reproduction, and the like, for a music piece as the search result.

The chat utterance is utterance related to search or recommendation of a music piece in an utterance content, and is utterance excluding the search utterance and the feedback utterance.

The chat utterance is, for example, memories, impressions, or the like of the user related to a music piece. That is, the chat utterance is utterance such as "I used to listen to the music piece of title A often" or utterance such as "I like the music piece of Artist B", and is information referred to when a music piece is searched and information necessary for estimating a user's character.

The music chat DB 156 stores chat utterance as a music chat. This music chat is used, for example, when the music piece search engine 157 searches for a music piece on the basis of the search utterance or the feedback utterance.

That is, for example, when the music piece search engine 157 searches for a music piece on the basis of the search utterance or the feedback utterance, a genre, an artist, and the like of a music piece that have appeared in the user's memories registered as the music chat are used to narrow down the music piece.

In a case where the search utterance is extracted from the search utterance extraction unit 154 or the feedback utterance is extracted from the feedback utterance extraction unit 155, the music piece search engine 157 searches the music pieces registered in the music piece DB 158 for a target music piece on the basis of the extracted search utterance or feedback utterance, and outputs to the response generation unit 159. As a specific search method, for example, the music piece search engine 157 may search for a music piece by content-based type filtering processing based on the search utterance or the feedback utterance.

Furthermore, the music piece search engine 157 also uses information of the music chat registered in the music chat DB 156 together with the search utterance or the feedback utterance, to search for the music pieces registered in the music piece DB 158 for a target music piece.

The music piece search engine 157 learns a user's preference on the basis of the search utterance, the feedback utterance, and the music chat registered in the music chat DB 156, and searches for a music piece reflecting a user's intention, and outputs music piece data related to the searched music piece and metadata including detailed information of the music piece, to the response generation unit 159.

For example, in such a case where it is known (has been learned) that there are many instructions for searching for a music piece of a specific genre Y on the basis of the search utterance, the feedback utterance, and the music chat registered in the music chat DB 156, even when there is a request such as "exciting music", the music piece search engine 157 performs search to further narrow down to a music piece of the specific genre Y from a searched music piece. By such searching, a music piece close to the user's preference is to be searched.

In the music piece DB 158, meta information of a music piece is registered in association with music piece data serving as sound source data of the music piece. The meta information is, for example, information such as an artist, a music piece title, lyrics, a label, a release time, a genre, tempo, chord progression, a used musical instrument, and a title of a movie that has adopted the music piece. Therefore, the music piece search engine 157 searches for a music piece by using the meta information of the music piece in accordance with the search utterance or the feedback utterance, which is the request of the user.

Note that the meta information registered in association with the music piece data registered in the music piece DB 158 may be information other than this.

The response generation unit 159 generates a response on the basis of the chat utterance, or the music piece data and the metadata that are of the music piece searched by the music piece search engine 157 and are generated in accordance with each of the chat utterance, the search utterance, and the feedback utterance analyzed by the semantic analysis processing unit 152. Further, the response generation unit 159 outputs the response to the voice synthesis unit 160 and the music piece reproduction unit 161.

More specifically, for example, in a case where there is the search utterance such as "play exciting music" or the feedback utterance such as "play music with more up-tempo", the response generation unit 159 generates a music piece list and an image expressing a feature of the music piece, on the basis of music piece data of the music piece searched according to the search utterance and the feedback utterance and on the basis of the meta information of the music piece, and outputs as a response result to the music piece reproduction unit 161 together with the music piece data.

Furthermore, at this time, the response generation unit 159 outputs, to the voice synthesis unit 160, a response including text information for generating response utterance for the search utterance of the user, such as "exciting Title X you like will be reproduced", for the search utterance.

Moreover, in a case of receiving, as the feedback utterance, an instruction for an operation related to reproduction, such as reproduction of the searched music piece, pause, return to the previous music, or advance to the next music, for example, the response generation unit 159 implements a corresponding operation.

Moreover, the response generation unit 159 includes a character generation engine 181.

The character generation engine 181 analyzes a user's character on the basis of the chat utterance supplied from the chat utterance extraction unit 153, and reflects the user's character, which is the analysis result, in the response to make a change.

For example, when the utterance content of the chat utterance includes a lot of music piece introduction, phrases for excitement, and the like, the character generation engine 181 generates the character while regarding the user's character as a DJ.

Then, for example, in such a case where "exciting Title X you like will be reproduced" is to be generated as the response utterance, when the user's character generated by the character generation engine 181 is a DJ, the response generation unit 159 converts the response utterance so that a DJ character such as "let's enjoy with Title X!" appears, and outputs the response utterance to the voice synthesis unit 160.

It has been experimentally found that a user utters more feedback utterance for response utterance having a strong character.

Therefore, it becomes possible to obtain more feedback utterance from the user by generating the response utterance in such an expression having a strong character.

As a result, it becomes possible to appropriately search for and reproduce a music piece desired by the user on the basis of more feedback utterance.

On the basis of the music piece data as the response supplied from the response generation unit 159, the music piece reproduction unit 161 outputs the music piece data as sound from the sound output unit 121 including a speaker, and displays the music piece list and an image expressing features of the music piece on the image display unit 122.

At this time, the music piece reproduction unit 161 causes the light emitting unit 123 to emit light or the vibration unit 124 to vibrate in accordance with the sound outputted from the sound output unit 121 on the basis of the music piece data.

The voice synthesis unit 160 synthesizes and generates corresponding voice on the basis of text information for generating the response utterance, and outputs as voice from the sound output unit 121.

Search Result Image

Next, a description is given to an example of a search result image generated by the response generation unit 159 on the basis of a music piece list and music piece data searched by the music piece search engine 157.

For example, in a case where the search utterance is "exciting music", the music piece search engine 157 searches for a corresponding music piece on the basis of the "exciting music", and outputs music piece data of the searched music piece and meta information of the music piece, to the response generation unit 159.

Figure 4:
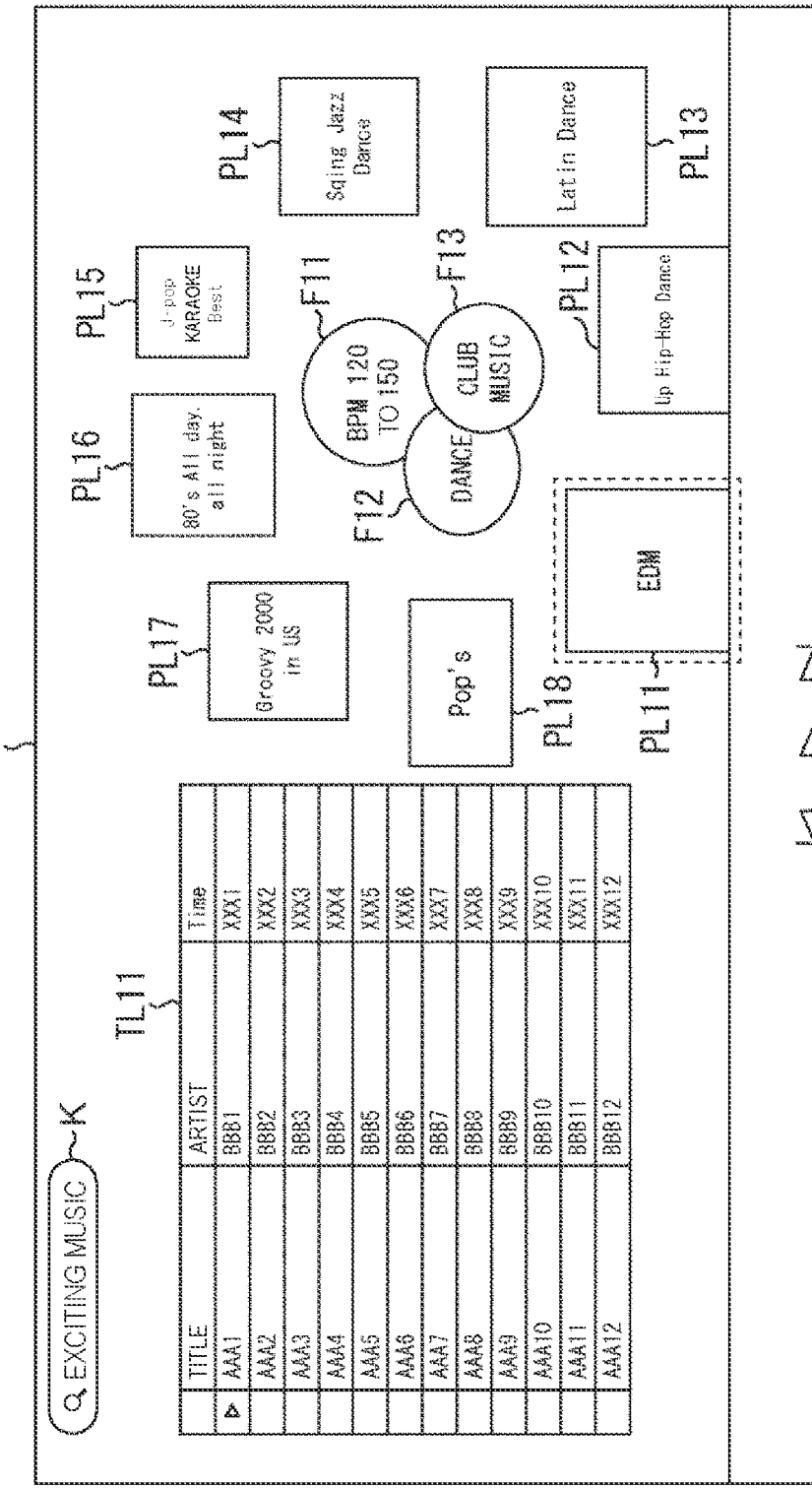
FIG. 4 is a view for explaining a search result image.

The response generation unit 159 generates a search result image as illustrated in an image P11 of FIG. 4 on the basis of the music piece data of the searched music piece and the meta information of the music piece supplied from the music piece search engine 157, outputs the search result image to the music piece reproduction unit 161, and causes the image display unit 122 to display.

In the image P11, in an upper left part, a keyword display field K is provided in which a keyword extracted from the search utterance is displayed. In the case of FIG. 4, "exciting music" is written to indicate that the search keyword based on the search utterance is "exciting music".

Below the keyword display field K, a music piece list TL11 is displayed, which is a list of music pieces searched with the search keyword, in which a reproduction display field, a title display field, an artist display field, and a theme display field (Theme) are provided from the left. From the top of each, whether or not the music piece is being reproduced, the title of the music piece, the artist of the music piece, and the theme of the music piece are displayed for each searched music piece.

Note that, for the music piece being reproduced, a triangular mark is displayed in the reproduction display field. In the case of FIG. 4, it is indicated that a music piece of a title AAA1 is being reproduced.

In the music piece list TL11 of the image P11, "AAA1" to "AAA12" are written in the title display field from the top, "BBB1" to "BBB12" are written in the artist display field from the top, and "XXX1" to "XXX12" are written in the theme display field from the top.

As a result, it is indicated that the music pieces of the titles AAA1 to AAA12 are music pieces of the artists BBB1 to BbB12 respectively, and the respective themes are XXX1 to XXX12.

Note that, although 12 music pieces of the titles AAA1 to AAA12 are written in the music piece list TL11 of FIG. 4, more music pieces may be displayed by scroll display in such a case where more music pieces have been searched.

Furthermore, an icon representing a feature of the searched music piece is displayed on a right part of the image P11.

More specifically, in the right part of the image P11, icons PL11 to PL18 are shown for each playlist of the searched music pieces.

Here, the playlist of music pieces indicates, for example, a list of music piece groups of the same genre or the same album.

The icon PL11 of FIG. 4 is written with "EMD Party Mix" to indicate that the icon PL11 represents a playlist including a music piece group classified as "EMD Party Mix".

Furthermore, the icon PL12 is written with "Up Hip-Hop Dance" to indicate that the icon PL12 represents a playlist including a music piece group classified as "Up Hip-Hop Dance".

Moreover, the icon PL13 is written with "Latin Dance" to indicate that the icon PL13 represents a playlist including a music piece group classified as "Latin Dance".

Furthermore, the icon PL14 is written with "Sqing Jazz Dance" to indicate that the icon PL12 represents a playlist including a music piece group classified as "Sqing Jazz Dance".

Moreover, the icon PL15 is written with "J-pop Karaoke Best" to indicate that the icon PL15 represents a playlist including a music piece group classified as "J-pop Karaoke Best".

Furthermore, the icon PL16 is written with "80's All day, all night" to indicate that the icon PL16 represents a playlist including a music piece group classified as "80's All day, all night".

Moreover, the icon PL17 is written with "Groovy 2000 in US" to indicate that the icon PL17 represents a playlist including a music piece group classified as "Groovy 2000 in US".

Furthermore, the icon PL18 is written with "Pop's" to indicate that the icon PL18 represents a playlist including a music piece group classified as "Pop's".

Moreover, the icons PL11 to PL18 each can be selected by an operation of a pointer or the like. When any icon is selected, display on the right part of the image P11 changes to a playlist selection image according to a corresponding playlist.

Note that the playlist selection image in a case where any of the icons PL11 to PL18 is selected will be described later in detail with reference to FIG. 5.

Furthermore, information indicating features of a music piece as a search result is displayed as balloons F11 to F13 at a center of the icons PL11 to PL18.

More specifically, the balloon F11 is written with "BPM 120 ~150" to indicate that the BPM, which is one of the features of the searched music piece, is 120 to 150.

Furthermore, the balloon F12 is written with "DANCE" to indicate that the genre, which is one of the features of the searched music piece, is DANCE.

Moreover, the balloon F13 is written with "CLUB MUSIC" to indicate that the genre, which is one of the features of the searched music piece, is CLUB MUSIC.

Furthermore, each of the balloons F11 to F13 expresses the feature by a balloon size. For example, the balloon F11 is the largest, and the balloons F12 and F13 are written smaller than the balloon F11 in FIG. 4, which indicates that the searched music piece group has the largest feature that the BPM is 120 to 150, and the features of including "DANCE" and "CLUB MUSIC" as genres are the second largest.

The size of the feature expressed by the balloon may be determined by, for example, a ratio or the like of the number of music pieces having the feature among a plurality of music piece groups as the search result.

That is, for example, in a case where the number of searched music pieces is 100, when 90 music pieces have a first feature and 50 music pieces have a second specific amount, a radius of a balloon representing the second feature may be 5R/9 when a radius of a balloon representing the first feature is R.

By the size of the balloon expressing the feature in this way, it becomes possible to recognize a proportion of the music pieces having the feature in the searched music pieces, and to visually and intuitively recognize how many music pieces include how many of which features, in the entire searched music pieces.

Furthermore, only balloons having a predetermined radius or more may be adopted for the feature expressed by the balloon. By doing this way, a feature having a size insufficient for recognition as a feature is not displayed, and only a large feature can be easily recognized.

Furthermore, as long as the size of the feature can be recognized, a shape other than the balloon may be adopted. For example, a rectangular shape or a star shape may be adopted, or the size of the shape may be made the same and the size of the feature may be expressed by a color density or the like.

Moreover, an operation display field C11 is provided in a lower part of the image P11, which is provided with, from the left in the figure, a button B13 operated when the music piece to be reproduced is returned to the previous music (returned to the previous music above in the music piece list TL11), a button B11 operated for giving a reproduction instruction, and a button B12 operated when the music piece to be reproduced is advanced to the next music (advanced to the next music below in the music piece list TL11). The button B11 for instructing reproduction is switched to and displayed as a stop button when reproduction is started, functions as the stop button while a music piece is being reproduced, and functions as the reproduction button again when the reproduction of the music piece is stopped.

That is, when the buttons B11 to B13 are operated in a state where any one of the music pieces written in the music piece list TL11 is selected, an operation to return to the previous music, reproduce (stop), or advance to the next music is performed on the selected music piece, corresponding to the operated button.

In this way, by displaying the searched music pieces as an icon on a playlist basis, it becomes possible to visually recognize what type of playlist the searched music piece group has been searched as.

As a result, it becomes possible to intuitively recognize what music piece group having what kind of feature and being searched as what kind of playlist, the searched music piece group is.

Furthermore, in a case where a music piece intended by the self has been searched, it is possible to perform reproduction satisfactorily after intuitively recognizing what kind of playlist including what kind of feature the searched music piece group is.

Moreover, in a case where the music piece intended by the self has not been searched, it is possible to recognize a difference from the music piece group intended by the self on the basis of the feature, after intuitively recognizing what music piece group having what kind of feature and being searched as what kind of playlist the searched music piece group is, and it is possible to facilitate the search for the music piece intended by the self by designating a further request, that is, feedback, necessary for searching for the music piece intended by the self, as a music piece having the feature as the difference.

For example, when the playlist including a genre X of the music piece intended by the self does not exist in the playlist of the music piece group as the search result, the music piece intended by the self can be easily searched by designating the genre X of the music piece intended by the self as the feedback.

As a result, it becomes possible to efficiently search for a music piece intended by the self.

Playlist Selection Image

Next, a playlist selection image displayed when any of the icons PL11 to PL18 of FIG. 4 is selected will be described with reference to FIG. 5.

For example, when the icon PL11 surrounded by a dotted line and written with "EDM" in FIG. 4 is selected, the music piece search engine 157 outputs meta information corresponding to music piece data belonging to the selected playlist, to the response generation unit 159.

Figure 5:
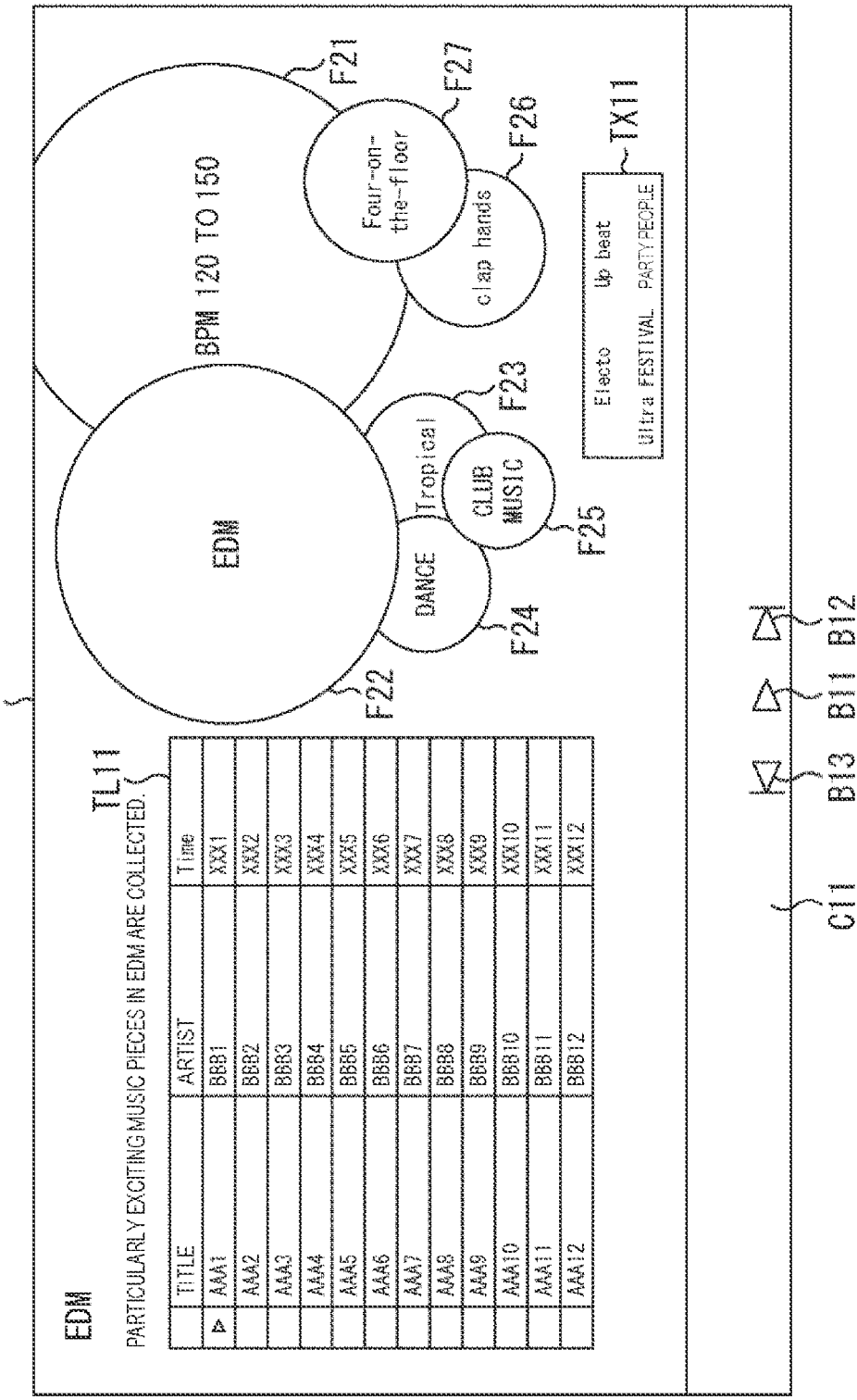
FIG. 5 is a view for explaining a playlist selection image.

On the basis of the meta information corresponding to the music piece data belonging to the selected playlist, the response generation unit 159 generates, for example, a playlist selection image as indicated by an image P31 of FIG. 5, outputs to the music piece reproduction unit 161, and causes the image display unit 122 to display.

Note that, in the image P31 of FIG. 5, the music piece list TL11 and the operation display field C11 in the figure are the same as those in the image P11 of FIG. 4, and thus the description thereof will be omitted.

In the image P31, which is the playlist selection image of FIG. 5, display in an upper right part of the figure is different from the image P11 of FIG. 4.

In the display in the upper right part of the image P31 of FIG. 5, in order to express the features of the music pieces belonging to the selected playlist, each feature is expressed as a balloon with a size thereof.

More specifically, in the image P31 of FIG. 5, balloons F21 to F27 are displayed.

The balloon F21 is written with "BPM 120~150" to indicate that the beats per minute (BPM), which is one of the features of the music pieces included in the selected playlist, is 120 to 150.

The balloon F22 is written with "EDM" to indicate that the genre, which is one of the features of the music pieces included in the selected playlist, is electronic dance music (EDM).

The balloon F23 is written with "Tropical" to indicate that the genre, which is one of the features of the music pieces included in the selected playlist, is tropical (a music piece having a feel of a tropical region).

The balloon F24 is written with "DANCE" to indicate that the genre, which is one of the features of the music pieces included in the selected playlist, is dance music.

The balloon F25 is written with "CLUB MUSIC" to indicate that the genre, which is one of the features of the music pieces included in the selected playlist, is club music.

The balloon F26 is written with "clap hands" to indicate that the genre, which is one of the features of the music pieces included in the selected playlist, is a music piece of clap hands (which excites with handclaps).

The balloon F27 is written with "Four-on-the-floor" to indicate that the genre, which is one of the features of the music pieces included in the selected playlist, is Four-on-the-floor.

Then, the balloon F21 is the largest balloon, which indicates that the largest feature of the music pieces included in the selected playlist is that the BPM is 120 to 150.

Furthermore, the balloon F22 is the second largest after the balloon F21, which indicates that the second feature of the music pieces included in the selected playlist is that the genre is EDM.

Moreover, it is indicated that the music pieces included in the selected playlist include dance music, club music, a music piece of clap hands (which excites with handclaps), and Four-on-the-floor as the third and subsequent features.

Furthermore, below the balloons F21 to F27, text TX11 related to the music pieces of the selected playlist is written, and "Electo", "Ultra FESTIVAL", "Up beat", and "party people" are written in the image P31.

As indicated by the image P31, by indicating each element expressing the feature of the music pieces included in the selected playlist by a balloon, and expressing the size of the feature by the size of the balloon, the feature of the music pieces included in the selected playlist can be recognized.

As a result, the features of the music pieces included in the selected playlist can be recognized.

Furthermore, in a case where a playlist including a music piece group intended by the self has been searched, it is possible to reproduce the music piece group satisfactorily after intuitively recognizing what playlist having what kind of feature and constituting what kind of music piece group, the music piece group of the searched playlist is.

Moreover, in a case where the playlist including the music piece group intended by the self has not been searched, it is possible to recognize a difference from the playlist including the music piece group intended by the self on the basis of the feature, after intuitively recognizing what playlist having what kind of feature and including what kind of music piece group the searched music piece group is. Further, by designating, as the playlist including the music piece group having a feature as the difference, a further request, that is, feedback necessary for searching for the playlist including the music piece group intended by the self, it is possible to easily search for the playlist including the music piece group intended by the self.

For example, when the music piece of the genre X intended by the self does not exist in the music piece group constituting the playlist as the search result, the music piece intended by the self can be easily searched by designating the genre X intended by the self as the feedback.

As a result, it becomes possible to efficiently search for a music piece intended by the self.

Music Piece Selection Image

Figure 6:
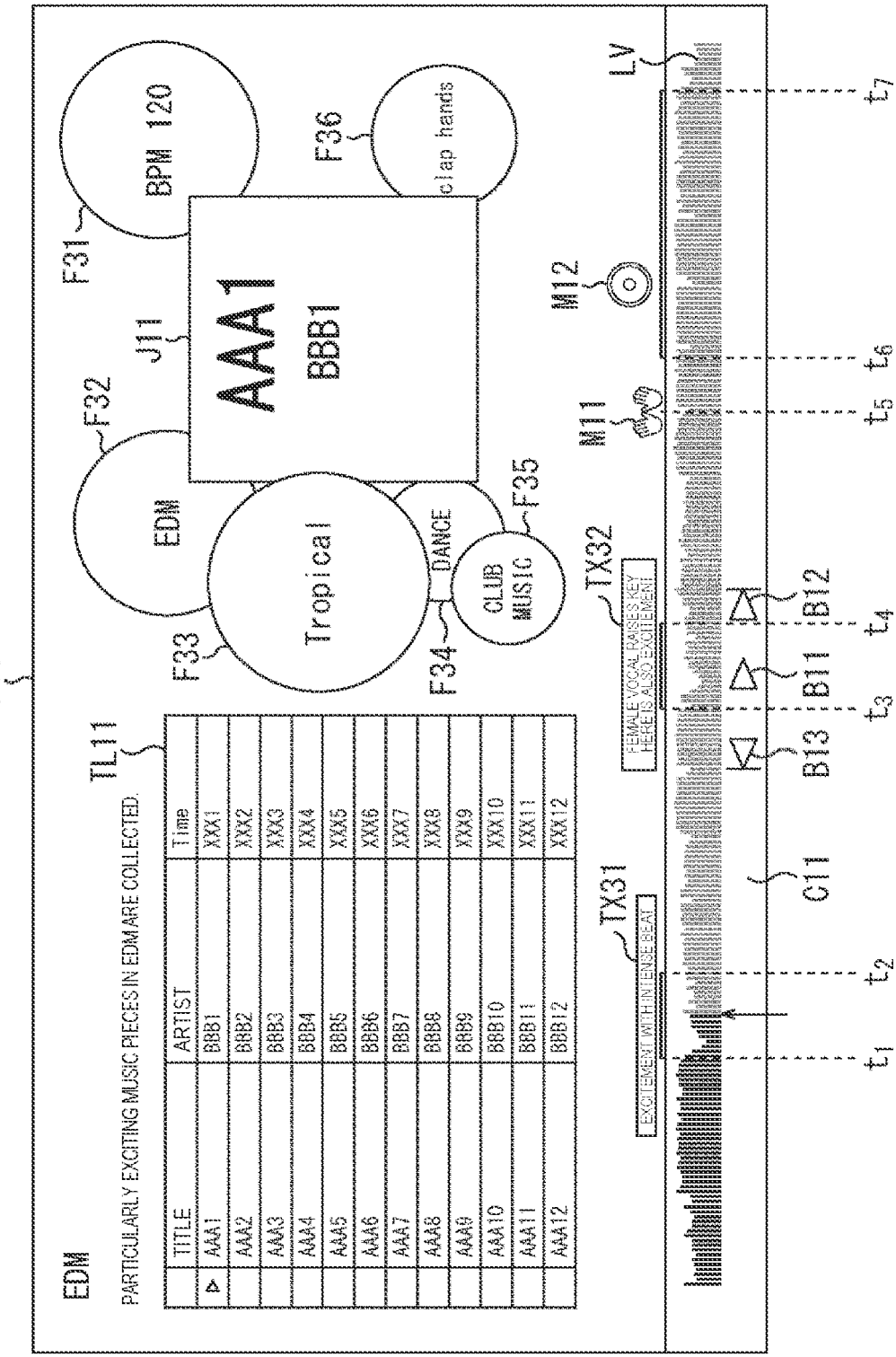
FIG. 6 is a view for explaining a music piece selection image.

Next, with reference to an image P51 of FIG. 6, a description is given to a music piece selection image in a state where the selected music piece is being reproduced, when the button B11 for instructing reproduction is operated in a state where any music piece in the music piece list TL11 of FIG. 4 or 5 is selected.

For example, when any music piece is selected from the music piece list TL11 in the image P51 and instructed to be reproduced as a feedback response, the music piece search engine 157 outputs meta information corresponding to music piece data instructed to be reproduced, to the response generation unit 159.

On the basis of the meta information corresponding to the music piece data belonging to the selected music piece, the response generation unit 159 generates, for example, a music piece selection image as indicated by the image P51 of FIG. 6, outputs to the music piece reproduction unit 161, and causes the image display unit 122 to display.

In the image P51, a triangular mark indicates that a music piece of the title "AAA1" is selected in the music piece list TL11.

Furthermore, in a right part of the image P51, a jacket J11 indicating a music piece selected and being reproduced and balloons F31 to F36 for explaining features of the music piece being reproduced are illustrated.

More specifically, in the jacket J11, "AAA1" is written in an upper part to indicate that the title of the music piece instructed to be reproduced and being currently reproduced is "AAA1", and "BBB1" is written in a lower part to indicate that the artist of the music piece being reproduced is "BBB1".

Furthermore, the circular balloons F31 to F36 are provided around the jacket J11, and each of them expresses a feature of the music piece instructed to be reproduced and a size thereof. Note that the size of the feature expressed by the size of the balloon here may be, for example, a ratio of a length of a reproduction time in a state of having a predetermined feature in a reproduction time.

That is, for example, in a case where there is a feature that the BPM is 120 over the entire reproduction time, and a radius of a balloon representing the feature that the BPM is 120 is expressed as a radius R, when a length of a reproduction time of a portion having tropical tone is half of the entire length, a radius of a balloon representing the feature indicating the tropical tone may be set to a radius R/2.

Here, the balloon F31 is written with "BPM 120" to indicate that beats per minute (BPM), which is one of the features of the music piece instructed to be reproduced, is 120.

Furthermore, the balloon F32 is written with "EDM" to indicate that the genre, which is one of the features of the music piece instructed to be reproduced, is electronic dance music (EDM).

Moreover, the balloon F33 is written with "Tropical" to indicate that one of the features of the music piece instructed to be reproduced is a music piece having a feel of a tropical region.

The balloon F34 is written with "DANCE" to indicate that one of the features of the music piece instructed to be reproduced is dance music.

The balloon F35 is written with "CLUB MUSIC" to indicate that one of the features of the music piece instructed to be reproduced is club music.

The balloon F36 is written with "clap hands" to indicate that one of the features of the music piece instructed to be reproduced is exciting music with handclaps.

Then, the balloon F33 is the largest balloon, which indicates that the largest feature of the music piece instructed to be reproduced is tropical tone (tone having a feel of a tropical region).

Furthermore, the balloons F31 and F32 are the second largest after the balloon F33, which indicates that the second features of the music piece instructed to be reproduced are the BPM being 120 and the genre being EDM.

Moreover, it is indicated that features having the fourth and subsequent size of the music piece instructed to be reproduced include dance music, club music, and an element that excites with handclaps.

As illustrated in the image P51, by presenting the features of the music piece instructed to be reproduced and the size thereof, the user can recognize the feature serving as a reason and a basis that the music piece instructed to be reproduced has been searched.

As a result, in a case where the music piece instructed to be reproduced is the music piece intended by the self, it is possible to reproduce the searched music piece after understanding well and being satisfied with the reason and the basis of being searched.

Furthermore, in a case where the searched music piece is not the music piece intended by the self, it is possible to consider such feedback to allow the music piece intended by the self to be searched, on the basis of the feature included in the music piece and serving as the reason and the basis of being searched and on the basis of the size of the feature.

That is, in a case where, as the music piece intended by the user, a music piece having the feature as dance music is desired rather than the feature as a music piece having a tropical tone (a music piece having a feel of a tropical region), it is possible to facilitate the search for the music piece intended by the self by feeding back a request such as "more danceable".

Furthermore, in a case where a music piece in which BPM of the music piece intended by the user is faster than 120 is desired, it is possible to facilitate the search for the music piece intended by the self by feeding back a request such as "more up-tempo".

As a result, by presenting information that allows recognition of a feature serving as a reason and a basis of a searched music piece, the searched music piece can be reproduced in a satisfactory state in a case where the music piece intended by the user has been searched, and appropriate feedback can be given and the music piece intended by the user can be efficiently searched in a case where unintended music piece has been searched.

Moreover, in the operation display field C11, a time-series image LV that indicates an output level of the music piece instructed to be reproduced in a bar graph shape in time series is displayed.

In the time-series image LV, a timing at which the music piece is currently reproduced is indicated by an arrow, and the arrow moves rightward in the figure as the reproduction of the music piece progresses.

Furthermore, in the time-series image LV, information that serves as a basis for the "exciting music" as a search target is indicated.

More specifically, in a period in which a feature state indicated by time t1 to time t2 continues (hereinafter, also referred to as a feature period), text information TX31 indicating "excitement with intense beat" is displayed to indicate that the period from the time t1 to the time t2 of the music piece being reproduced is a period in which there is excitement with the beat becoming intense.

Furthermore, in a feature period from time t3 to the time t4, text information TX32 written with "female vocal raises key, here is also excitement" is displayed to indicate that the feature period from the time t3 to the time t4 of the music piece being reproduced is a period in which a female vocal raises a key and there is excitement.

Moreover, in a feature period at time t5, a mark M11 indicating a handclap is written to indicate that excitement is raised with handclaps at the time t5.

Furthermore, in a feature period from time t6 to time t7, a mark M12 indicating that there is excitement is illustrated.

Note that, when a music piece is reproduced, the light emitting unit 123 may be controlled to emit light in accordance with tempo, or the vibration unit 124 may be controlled to vibrate in accordance with tempo, in the feature periods in which the text information TX31 and TX32 are written or the feature periods in which the marks M11 and M12 are written.

Furthermore, for example, in such a case where the search utterance is "play cool music", voice of a response such as "you like this melody, don't you?" may be outputted in a feature period during reproduction.

Moreover, in such a case where the search utterance is "find a cherry blossom music", lyrics may be displayed in a feature period in which the lyrics of cherry blossom are sung.

Furthermore, in such a case where the search utterance is "play stylish music", display can be made as the text information TX31 and TX32 such as "the chord progression here is stylish" in the feature period.

Moreover, in such a case where the search utterance is "play music having excitement in the hook-line", "there is the hook-line after this, 3, 2, 1" may be presented immediately before the hook-line at a timing immediately before the feature period.

Furthermore, in such a case where the search utterance is "play vigorous music", the light emitting unit 123 may be illuminated and the vibration unit 124 may be vibrated in accordance with the beat in the feature period.

That is, the display of the time-series image LV is to present, in time series, the feature period that is the timing at which the feature serving as the basis and reason of being searched appears when the music piece searched as "exciting music" is reproduced, which allows the user to easily recognize the reason and the basis that the music piece has been searched.

As a result, in a case where the searched music piece is the music piece intended by the self, it is possible to reproduce the searched music piece after understanding well and being satisfied with the feature serving as the reason and the basis of being searched.

Furthermore, in a case where the searched music piece is not the music piece intended by the self, it is possible to consider such feedback to allow the music piece intended by the self to be searched, on the basis of the feature included in the music piece and serving as the reason and the basis of being searched and on the basis of the size of the feature.

That is, in a case where, as the music piece intended by the user, a music piece having a feature as dance music is desired rather than a feature as a music piece having a tropical tone (a music piece having a feel of a tropical region), it is possible to facilitate the search for an intended music piece by giving feedback for searching for the music piece having the feature as dance music.

More specifically, in a case where a music piece having a feature as dance music is desired, it is possible to facilitate the search for the music piece intended by the self by feeding back a request such as "more danceable".

Furthermore, in a case where a music piece in which BPM of the music piece intended by the user is faster than 120 is desired, it is possible to facilitate the search for the music piece intended by the self by feeding back a request such as "more up-tempo".

As a result, by presenting information that allows recognition of a feature serving as a reason and a basis of a searched music piece, the searched music piece can be reproduced in a satisfactory state in a case where the intended music piece has been searched, and appropriate feedback can be given and the music piece intended by the user can be efficiently searched in a case where unintended music piece has been searched.

Character Generation Processing

Figure 7:
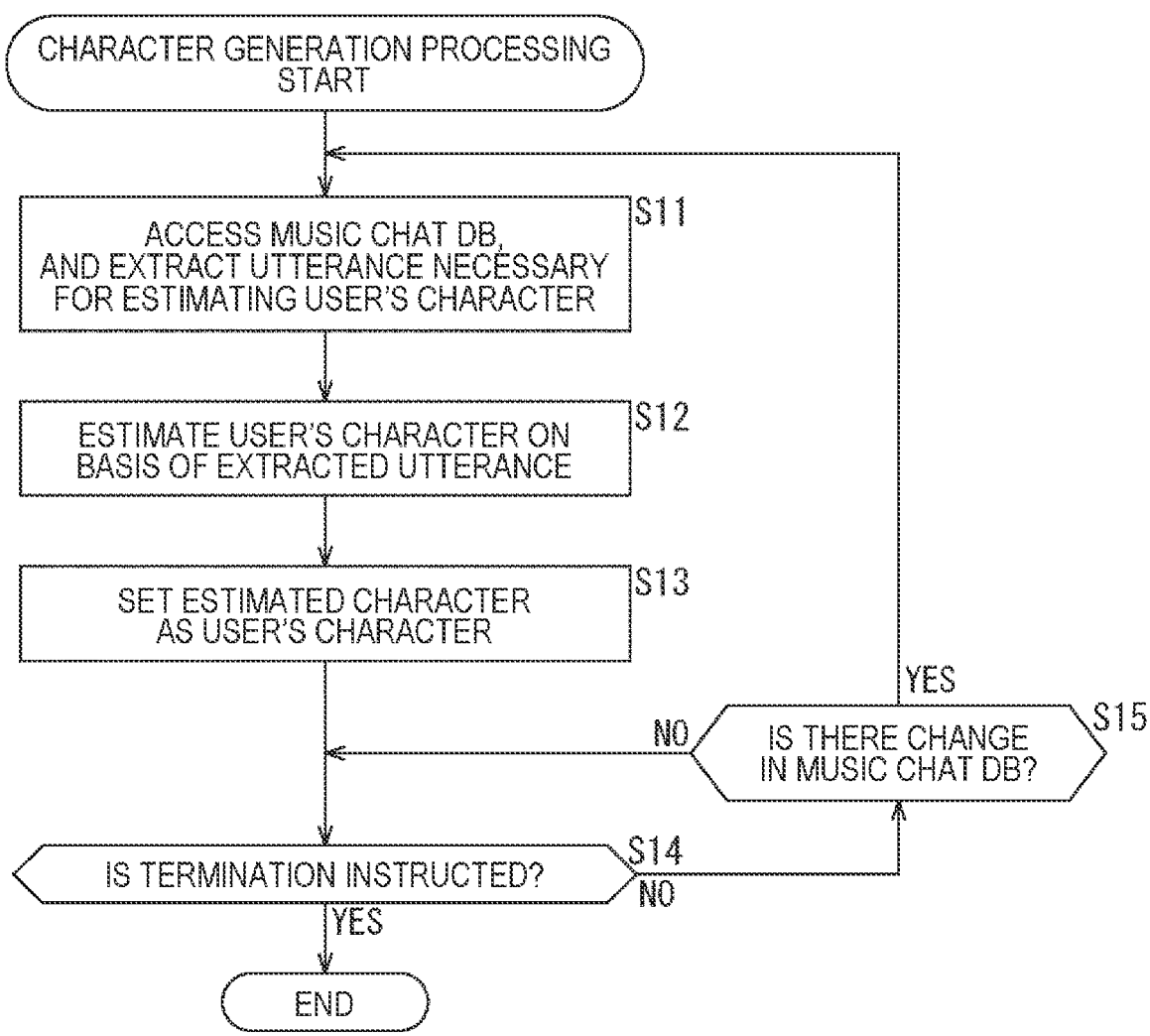
FIG. 7 is flowchart for explaining character generation processing.

Next, character generation processing will be described with reference to a flowchart in FIG. 7. Note that, in this processing, it is premised that the chat utterance is extracted by the chat utterance extraction unit 153 in music piece agent processing to be described later and registered in the music chat DB 156.

In step S11, the character generation engine 181 of the response generation unit 159 accesses the music chat DB 156, and extracts chat utterance registered as a music chat for estimating the user's character.

In step S12, the character generation engine 181 estimates the user's character on the basis of the extracted chat utterance as the music chat.

More specifically, the character generation engine 181 analyzes the extracted chat utterance as the music chat, for example, collates with a technical term of each occupation on the basis of a frequently used phrase or keyword, and estimates a corresponding occupation or the like as a character.

In step S13, the character generation engine 181 sets the estimated character as the user's character.

In step S14, the character generation engine 181 determines whether or not termination of the character generation processing has been instructed. In a case where termination has not been instructed, the processing proceeds to step S15.

In step S15, the character generation engine 181 accesses the music chat DB 156 and determines whether or not there is a change due to registration of new chat utterance in the music chat DB 156. In a case where there is no change, the processing returns to step S14.

That is, in a case where termination is not instructed and there is no change in the music chat DB 156, the processing of steps S14 and S15 is repeated.

Then, in step S15, in a case where there is a change due to registration of new chat utterance in the music chat DB 156, the processing returns to step S11.

That is, in a case where there is a change due to registration of new chat utterance in the music chat DB 156, the user's character is estimated again by the processing of steps S11 to S14, and processing of setting the estimated character is performed.

Therefore, estimation and setting of the user's character are repeated every time user's chat utterance is newly registered in the music chat DB 156 until termination of the processing is instructed.

As a result, it becomes possible to improve accuracy of the estimated user's character.

Then, in step S14, in a case where termination of the processing is instructed, the processing is terminated.

According to the above processing, since the user's character is estimated from the user's chat utterance registered in the music chat DB 156, the user's character can be appropriately estimated.

Music Piece Agent Processing

Figure 8:
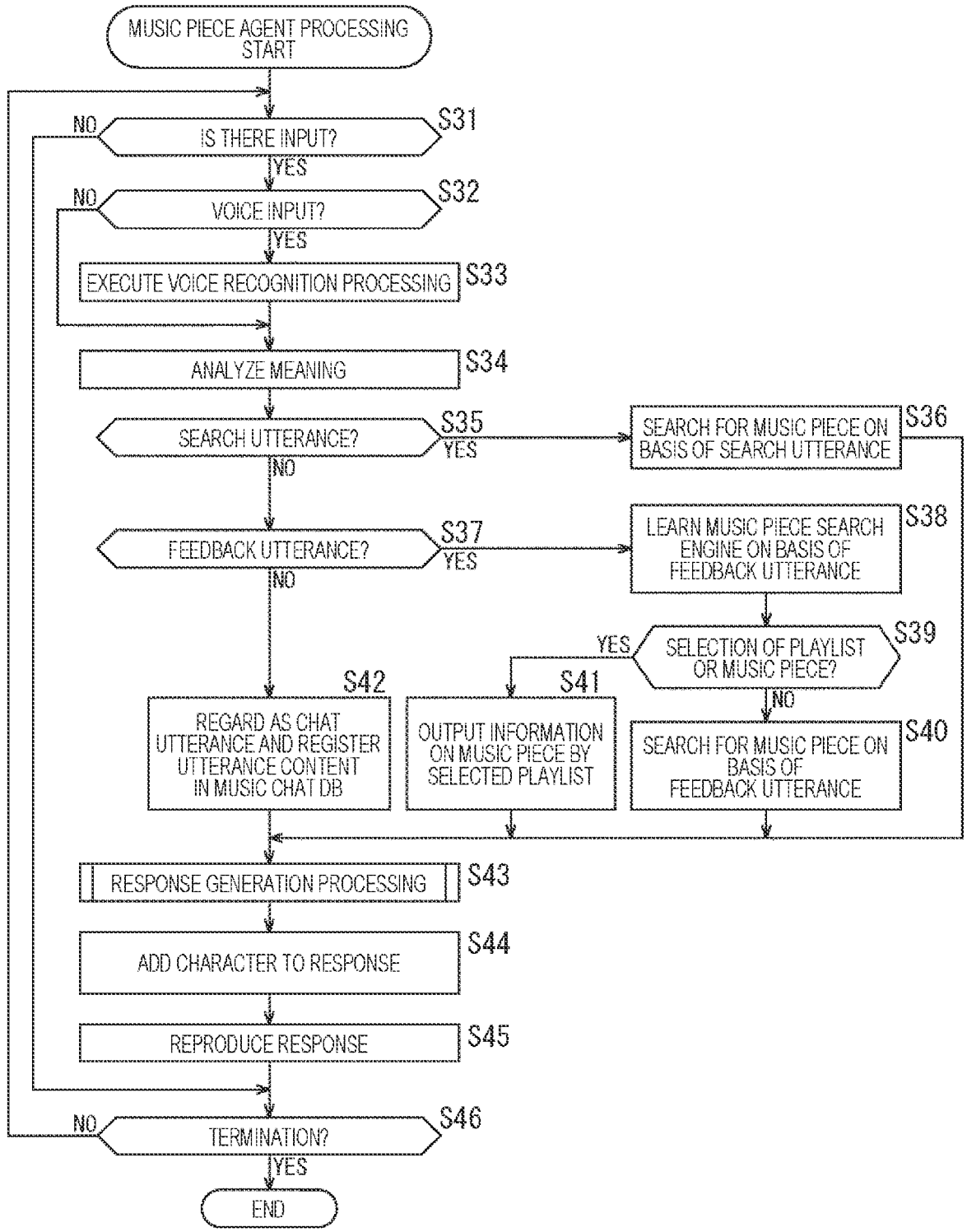
FIG. 8 is a flowchart for explaining music piece agent processing.

Next, the music piece agent processing will be described with reference to a flowchart in FIG. 8.

In step S31, the voice recognition processing unit 151 and the semantic analysis processing unit 152 determine whether or not there is any input (utterance) from the user by the keyboard 101 being operated or voice being detected by the microphone 102.

In a case where it is considered in step S31 that there is no input by the user, the processing in steps S32 to S44 is skipped.

Furthermore, in a case where it is considered in step S31 that there is an input (utterance) from the user, the processing proceeds to step S32.

In step S32, the voice recognition processing unit 151 determines whether or not there is a voice input, that is, an input by utterance, by detecting voice from the microphone 102.

In step S32, in a case where there is a voice input, that is, utterance, the processing proceeds to step S33.

In step S33, the voice recognition processing unit 151 executes voice recognition processing, analyzes the inputted utterance, and outputs a recognition result including text information to the semantic analysis processing unit 152.

Note that, in a case where the input is not a voice input in step S32, the input is to be text information inputted by operating the keyboard 101, and thus the processing in step S32 is skipped.

In step S34, the semantic analysis processing unit 152 analyzes a meaning of the utterance on the basis of either utterance including text information inputted by operating the keyboard 101 or utterance including text information that is the voice recognition result of the voice recognition processing unit 151, and outputs an analysis result to the chat utterance extraction unit 153, the search utterance extraction unit 154, and the feedback utterance extraction unit 155.

In step S35, the search utterance extraction unit 154 determines whether or not the utterance is the search utterance, on the basis of the analysis result of the utterance supplied from the semantic analysis processing unit 152.

In step S35, in a case where the utterance is the search utterance, the processing proceeds to step S36.

In step S36, the search utterance extraction unit 154 supplies text information including the search utterance to the music piece search engine 157.

Then, the music piece search engine 157 searches the music pieces registered in the music piece DB 158 on the basis of information of the chat utterance registered in the music chat DB 156 and the supplied search utterance, and supplies music piece data and meta information of the music piece that are a search result to the response generation unit 159, and the processing proceeds to step S42.

That is, in the case of the search utterance, a music piece as a search target is searched among the music pieces registered in the music piece DB 156, on the basis of the information of the chat utterance registered in the music chat DB 158 and the supplied search utterance.

Whereas, in a case where it is determined in step S35 that the utterance is not the search utterance, the processing proceeds to step S37.

In step S37, the feedback utterance extraction unit 155 determines whether or not the utterance is the feedback utterance, on the basis of the analysis result of the utterance supplied from the semantic analysis processing unit 152.

In a case of the feedback utterance in step S37, the processing proceeds to step S38.

In step S38, the music piece search engine 157 learns a user's preference on the basis of the feedback utterance.

That is, since the feedback utterance is utterance that is made when the search result is not the search result intended by the user or utterance for further narrowing down the search result, the user's preference appears. Therefore, the music piece search engine 157 learns the user's preference on the basis of a content of the feedback utterance.

Furthermore, the music piece search engine 157 learns the user's preference on the basis of a music piece instructed to be reproduced, a music piece not instructed to be reproduced, a music piece instructed to be reproduced but immediately instructed to be stopped, and the like, in the instruction to reproduce the music piece as the search result.

In step S39, the music piece search engine 157 determines whether or not the content of the feedback utterance is for selecting a playlist or a music piece from the search result.

In step S39, in a case where the content of the feedback utterance is not for selecting a playlist or a music piece from the search result, the processing proceeds to step S40.

In step S40, the music piece search engine 157 searches the music pieces registered in the music piece DB 156 on the basis of information of the chat utterance registered in the music chat DB 158 and the feedback utterance, and supplies music piece data and meta information as the search result to the response generation unit 159, and the processing proceeds to step S42.

That is, since the feedback utterance is utterance that is made when the search result is not the search result intended by the user or utterance for further narrowing down the search result, the music piece search engine 157 searches for a music piece on the basis of the feedback utterance, and supplies music piece data and meta information as a search result to the response generation unit 159.

In step S39, in a case where the content of the feedback utterance is for selecting a playlist or a music piece from the search result, the processing proceeds to step S41.

In step S41, the music piece search engine 157 supplies, to the response generation unit 159, music piece data of a music piece group belonging to the playlist selected from the search result and meta information of the music piece, or music piece data of the selected music piece and meta information of the music piece.

Moreover, in a case where it is considered in step S37 that the utterance is not the feedback utterance, the processing proceeds to step S42.

In step S42, in a case where the utterance is neither the search utterance nor the feedback utterance from the analysis result supplied from the semantic analysis processing unit 152, the chat utterance extraction unit 153 regards the utterance as the chat utterance, registers the utterance in the music chat DB 156, and outputs to the response generation unit 159.

In step S43, the response generation unit 159 executes response generation processing, to generate a response to each of a search result supplied from the music piece search engine 157, a selection result of a playlist or a music piece from the search result, an instruction related to reproduction, and chat utterance.

Figure 9:
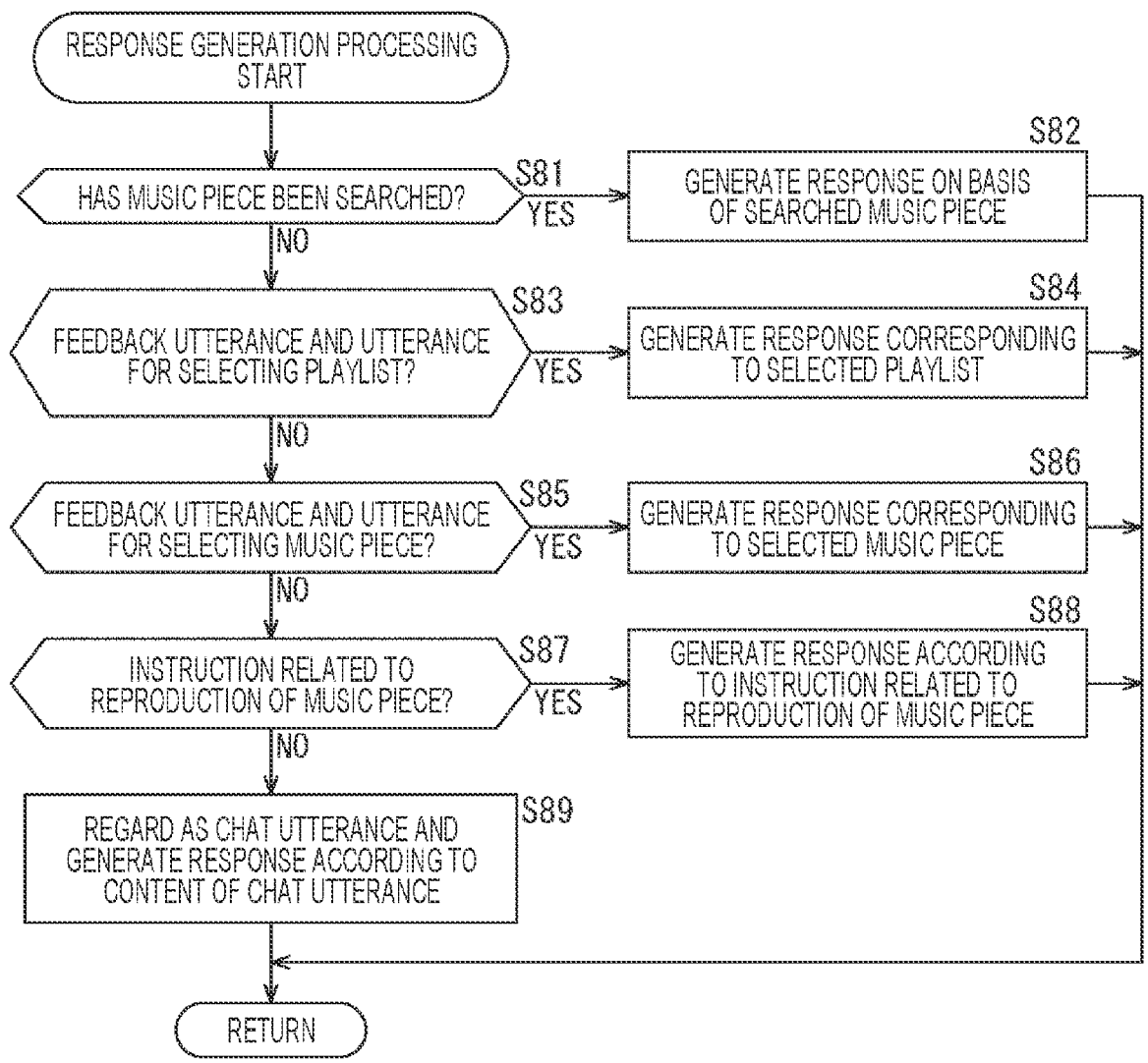
FIG. 9 is a flowchart for explaining response generation processing.

Note that the response generation processing will be described later in detail with reference to the flowchart of FIG. 9.

In step S44, the response generation unit 159 adds the user's character set in the character generation processing to the generated response, to convert.

In step S45, the response generation unit 159 outputs a response result to the voice synthesis unit 160 and the music piece reproduction unit 161, causes the sound output unit 121 to output as voice, and causes the image display unit 122 to display as a search result image, a playlist image, and a music piece selection image.

At this time, as necessary, in a case of reproducing a music piece, the music piece reproduction unit 161 may control the light emitting unit 123 to emit light in accordance with tempo of the music piece, or control the vibration unit 124 to vibrate in accordance with tempo of the music piece, at a timing when a feature of the music piece appears.

In step S46, the control unit 31 determines whether or not termination of the processing has been instructed, and the processing returns to step S31 in a case where termination has not been instructed. That is, the processing of steps S31 to S46 is repeated until termination is instructed.

Then, in step S46, when termination of the processing is instructed, the processing is terminated.

By the above processing, with the search utterance designating the music piece desired by the user to be searched by operating the keyboard 101 or inputting voice from the microphone 102, a music piece can be searched and presented, and the music piece can be reproduced.

Furthermore, when the music piece intended by the user is not searched or in such a case where the user desires to further narrow down the music piece, the music piece intended by the user can be easily searched by performing the feedback utterance.

Moreover, in a case of the feedback utterance, since the music piece search engine 157 learns the user's preference on the basis of the feedback utterance, search accuracy of the music piece can be improved by repeating the learning every time feedback is received.

Furthermore, since the user's character is added and presented at a time of presenting the search result, it becomes possible to acquire more feedback from the user, and thus, it becomes possible to improve search accuracy of the music piece by searching for a music piece with more feedback from the user.

As a result, in any case, it becomes possible to improve the search accuracy of the music piece intended by the user and more efficiently search for the music piece intended by the user.

Response Generation Processing

Next, the response generation processing will be described with reference to the flowchart of FIG. 9.

In step S81, the response generation unit 159 determines whether or not a response to be generated corresponds to a search result that is based on the search utterance and the feedback utterance and is supplied from the music piece search engine 157.

In step S81, in a case where the response to be generated corresponds to the search result that is based on the search utterance and the feedback utterance and is supplied from the music piece search engine 157, the processing proceeds to step S82.

In step S82, the response generation unit 159 generates the search result image described with reference to FIG. 4, for example, on the basis of the search result that is based on the search utterance and the feedback utterance and is supplied from the music piece search engine 157.

In step S81, in a case where the response to be generated does not correspond to the search result that is based on the search utterance and the feedback utterance and is supplied from the music piece search engine 157, the processing proceeds to step S83.

In step S83, the response generation unit 159 determines whether or not the response to be generated is the feedback utterance and is utterance for selecting an iconized playlist in the search result image.

In step S83, in a case where the response to be generated is the feedback utterance and is the utterance for selecting the iconized playlist in the search result image, the processing proceeds to step S84.

In step S84, the response generation unit 159 generates the playlist selection image described with reference to FIG. 5, for example, on the basis of the playlist corresponding to the icon selected in the search result image.

In step S83, in a case where the response to be generated is the feedback utterance and is not for the utterance for selecting a playlist, the processing proceeds to step S85.

In step S85, the response generation unit 159 determines whether or not the response to be generated is the feedback utterance and is utterance for selecting any music piece in the music piece list TL11.

In step S85, in a case where the response to be generated is the feedback utterance and the utterance for selecting any music piece in the music piece list TL11, the processing proceeds to step S86.

In step S86, the response generation unit 159 generates the music piece selection image described with reference to FIG. 6, for example, on the basis of information on the music piece selected in the music piece list TL11.

In step S85, in a case where the response to be generated is the feedback utterance and is not for the utterance for selecting a music piece, the processing proceeds to step S87.

In step S87, the response generation unit 159 determines whether or not the response to be generated is an instruction related to reproduction of a music piece.

In step S87, in a case where the response to be generated is the instruction related to reproduction of a music piece, the processing proceeds to step S88.

In step S88, the response generation unit 159 implements, for example, an operation corresponding to the buttons B11 to B13 in the operation display field C11 described with reference to FIGS. 4 to 6.

In step S87, in a case where the response to be generated is not the instruction related to reproduction of a music piece, the processing proceeds to step S89.

In step S89, the response generation unit 159 regards the utterance as chat utterance, and generates a response according to a meaning of the chat utterance.

By the above processing, a response according to the utterance content is generated, and thus, the search result image, the playlist selection image, and the music piece selection image are displayed, so that the features of the music piece, which also serve as the reason and the basis of being searched, are presented.

As a result, the user can recognize the features of the music piece, which also serve as the reason and the basis of being searched, and can recognize whether or not the music piece intended by the user himself/herself has been searched.

Furthermore, since it becomes possible to recognize each feature of all the music pieces of the search result, each playlist, and each music piece, it becomes possible to recognize whether or not the music piece intended by the user himself/herself has been appropriately searched in all the music pieces of the search result on a playlist basis or on a music piece basis.

Moreover, by displaying the music piece selection image, it becomes possible to recognize what music piece having what kind of feature at which timing in the music piece has been searched, and it becomes possible for the user to recognize what kind of reason and basis that the music piece has been searched.

As a result, when a music piece that is not intended by the user has been searched, the user can narrow down the feature or give feedback to designate a new feature so that a music piece intended by the self is searched.

As a result, it becomes possible to efficiently search for a music piece in which a user's intention is appropriately reflected, at a time of searching for a music piece.

3. Example of Execution by Software

Meanwhile, a series of processes described above can be executed by hardware or can also be executed by software. In a case where the series of processes are executed by software, programs constituting the software are installed from a recording medium to a computer built in dedicated hardware or, for example, a general-purpose computer and the like capable of executing various functions by installing various programs.

Figure 10:
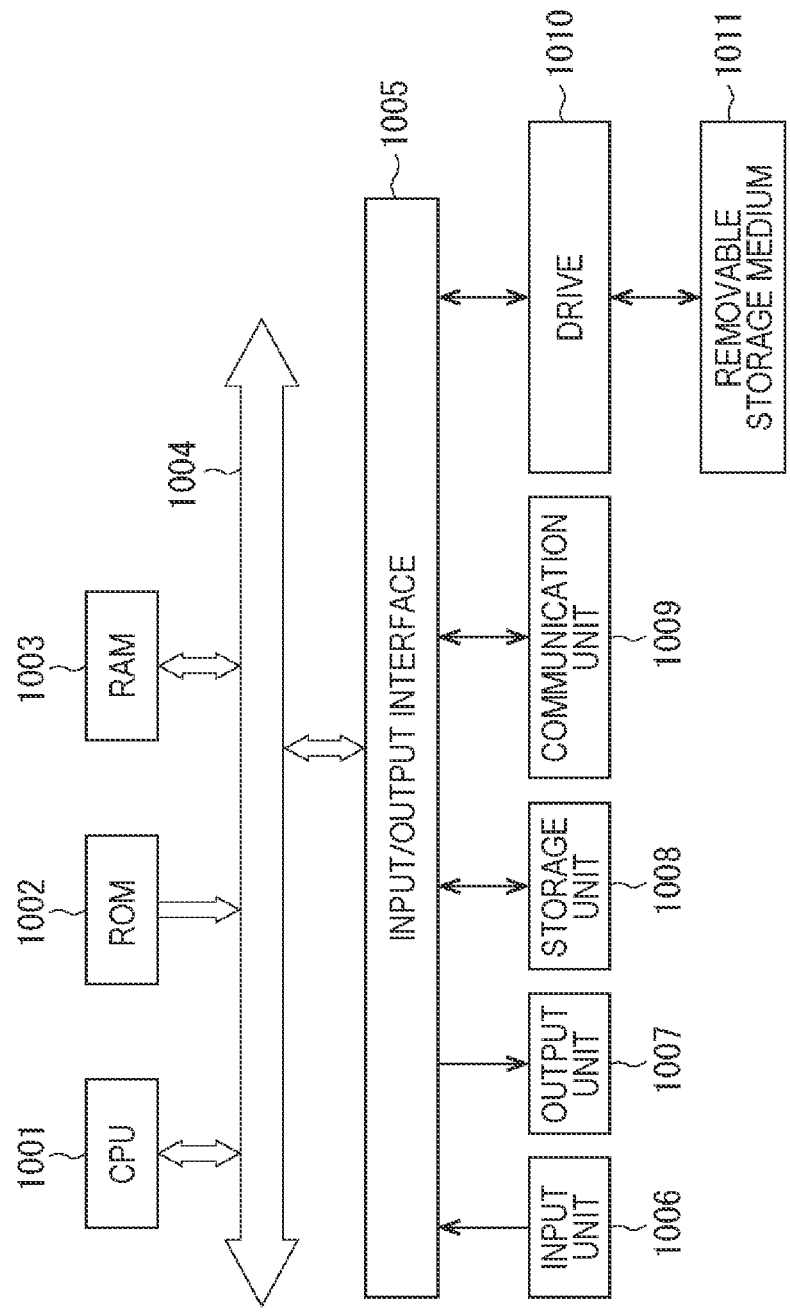
FIG. 10 is a diagram for explaining a configuration example of a general-purpose computer.

FIG. 10 illustrates a configuration example of a general-purpose computer. This personal computer incorporates a central processing unit (CPU) 1001. To the CPU 1001, an input/output interface 1005 is connected via a bus 1004. To the bus 1004, a read only memory (ROM) 1002 and a random access memory (RAM) 1003 are connected.

The input/output interface 1005 is connected with an input unit 1006 including an input device such as a keyboard and a mouse to be inputted with an operation command by a user, an output unit 1007 that outputs a processing operation screen or an image of a processing result to a display device, a storage unit 1008 including, for example, a hard disk drive that stores programs and various data, and a communication unit 1009 that includes a local area network (LAN) adapter and the like and executes communication processing via a network represented by the Internet. Furthermore, there is connected a drive 1010 that reads and writes data from and to a removable storage medium 1011 such as a magnetic disk (including a flexible disk), an optical disk (including a compact disc-read only memory (CD-ROM) and a digital versatile disc (DVD)), a magneto-optical disk (including a Mini Disc (MD)), or a semiconductor memory.

The CPU 1001 executes various processes in accordance with a program stored in the ROM 1002, or a program read from the removable storage medium 1011 such as a magnetic disk, an optical disk, a magneto-optical disk, or semiconductor memory, installed in the storage unit 1008, and loaded from the storage unit 1008 into the RAM 1003. The RAM 1003 also appropriately stores data necessary for the CPU 1001 to execute various processes, for example.

In the computer configured as described above, the series of processes described above are performed, for example, by the CPU 1001 loading a program recorded in the storage unit 1008 into the RAM 1003 via the input/output interface 1005 and the bus 1004, and executing.

The program executed by the computer (CPU 1001) can be provided by being recorded on, for example, the removable storage medium 1011 as a package medium or the like. Furthermore, the program can be provided via a wired or wireless transmission medium such as a local area network, the Internet, or digital satellite broadcasting.

In the computer, by attaching the removable storage medium 1011 to the drive 1010, the program can be installed in the storage unit 1008 via the input/output interface 1005. Furthermore, the program can be received by the communication unit 1009 via a wired or wireless transmission medium, and installed in the storage unit 1008. Besides, the program can be installed in advance in the ROM 1002 and the storage unit 1008.

Note that the program executed by the computer may be a program that performs processing in time series according to an order described in this specification, or may be a program that performs processing in parallel or at necessary timing such as when a call is made.

Note that the CPU 1001 in FIG. 10 implements the function of the control unit 31 in FIG. 2.

Furthermore, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Note that the embodiments of the present disclosure are not limited to the above-described embodiments, and various modified examples can be made without departing from the scope of the present disclosure.

For example, the present disclosure can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

Note that the present disclosure can also have the following configurations.

<1> An information processing apparatus including:

a search unit configured to search for a music piece on the basis of a search request of a user; and a response generation unit configured to generate, as a response to the search request, a search result including information expressing a feature that is of the music piece searched by the search unit and corresponds to the search request.

<2> The information processing apparatus according to <1>, in which the search unit searches for the music piece on the basis of search utterance that is utterance related to the search request.

<3> The information processing apparatus according to <2>, in which the search unit searches for the music piece on the basis of feedback utterance that is utterance related to a search request made for the search result based on the search utterance.

<4> The information processing apparatus according to <3>, in which the search unit learns a preference of the user related to search for the music piece, on the basis of the feedback utterance.

<5> The information processing apparatus according to <3>, in which the response generation unit further includes a character estimation unit configured to estimate a character of a user on the basis of chat utterance that is utterance including a chat, the chat utterance including the search utterance and the feedback utterance, and the generated response is converted in accordance with the character estimated by the character estimation unit.

<6> The information processing apparatus according to any one of <1> to <5>, in which the search unit outputs, as the search result, music piece data of the music piece that has been searched and meta information of the music piece, and the response generation unit generates, as a response to the search request, a search result image that is an image including information expressing a feature of a music piece as the search result, on the basis of the music piece data and the meta information that are included in the search result.

<7> The information processing apparatus according to <6>, in which the response generation unit generates, as a response to the search request, the search result image in which a feature of a music piece as the search result is expressed by an icon on a playlist basis.

<8> The information processing apparatus according to <7>, in which the response generation unit generates, as a response to the search request, the search result image in which a feature of a music piece as the search result is expressed by a size of a corresponding balloon.

<9> The information processing apparatus according to <8>, in which the response generation unit generates, as a response to the search request, a search result image in which a feature of a music piece as the search result is expressed by a balloon having a size defined by a ratio of a number of music pieces having the feature to a total number of searched music pieces.

<10> The information processing apparatus according to <8>, in which the response generation unit generates, as a response to the search request, a playlist selection image expressing a feature of a music piece belonging to a playlist corresponding to a selected icon among the icons.

<11> The information processing apparatus according to <10>, in which the response generation unit generates, as a response to the search request, the playlist selection image that is an image in which a feature of a music piece as the search result is expressed by a size of a corresponding balloon.

<12> The information processing apparatus according to <6>, in which the response generation unit further generates a music piece list that is a list of music pieces as the search result, on the basis of the music piece data and the meta information that are included in the search result, and causes reproduction of sound of music piece data of a music piece instructed to be reproduced, and generates a music piece selection image as a response to the search request, the music piece selection image being an image expressing a feature of the music piece instructed to be reproduced, on the basis of the music piece data and the meta information, when any music piece of the music piece list is selected and instructed to be reproduced.

<13> The information processing apparatus according to <12>, in which the response generation unit generates, as a response to the search request, a music piece selection image in which a feature of the music piece instructed to be reproduced is expressed by a size of a corresponding balloon, on the basis of the meta information.

<14> The information processing apparatus according to <12>, in which the response generation unit generates, as a response to the search request, a feature of the music piece instructed to be reproduced and the music piece selection image including a time-series image in which information serving as a basis of being searched is displayed in time series when the music piece is reproduced, on the basis of the music piece data and the meta information.

<15> The information processing apparatus according to <14>, in which in the time-series image, information serving as a basis of being searched is displayed as text or a mark.

<16> The information processing apparatus according to <12>, in which the response generation unit generates a response to the search request, by expressing a feature of the music piece instructed to be reproduced in time series by light emission or vibration when the music piece is reproduced, on the basis of the music piece data and the meta information.

<17> The information processing apparatus according to <6>, in which the meta information includes at least any one of an artist, a music piece title, lyrics, a label, a release time, a genre, tempo, chord progression, a used musical instrument, or information indicating whether or not to be a movie theme song, of the music piece.

<18> An information processing method including steps of:

searching for a music piece on the basis of a search request of a user; and generating, as a response to the search request, a search result including information expressing a feature that is of a searched music piece and corresponds to the search request.

<19> A program for causing a computer to function as:

a search unit configured to search for a music piece on the basis of a search request of a user; and a response generation unit configured to generate, as a response to the search request, a search result including information expressing a feature that is of the music piece searched by the search unit and corresponds to the search request.

REFERENCE SIGNS LIST

11 Information processing apparatus
31 Control unit
32 Input unit
33 Output unit
51 Music piece agent processing unit
101 Keyboard
102 Microphone
121 Sound output unit
122 Image display unit
123 Light emitting unit
124 Vibration unit
151 Voice recognition processing unit
152 Semantic analysis processing unit
153 Chat utterance extraction unit
154 Search utterance extraction unit
155 Feedback utterance extraction unit
156 Music chat DB
157 Music piece search engine
158 Music piece DB
159 Response generation unit
160 Voice synthesis unit
161 Music piece reproduction unit
181 Character generation engine

The invention claimed is:

1. An information processing apparatus, comprising:
a central processing unit (CPU) configured to:
   search for a music piece based on a search request of a user;
   generate, as a response to the search request, a search result including each of music piece data of the searched music piece, meta information of the searched music piece, and a search result image, wherein
      the search result image is based on the music piece data and the meta information,
      the search result image is an image including information regarding a first feature of the searched music piece,
      the first feature is associated with the search request, and
      the search result image expresses the first feature by a balloon having a size that corresponds to a ratio of a number of music pieces having the first feature to a total number of searched music pieces; and
   output the generated search result.

2. The information processing apparatus according to claim 1, wherein
the CPU is further configured to search the music piece, based on a search utterance, and
the search utterance corresponds to an utterance related to the search request.

3. The information processing apparatus according to claim 2, wherein
the CPU is further configured to search for the music piece, based on a feedback utterance, and
the feedback utterance is utterance made in response to the search result that is based on the search utterance.

4. The information processing apparatus according to claim 3, wherein the CPU is further configured to learn a preference of the user related to search for the music piece, based on the feedback utterance.

5. The information processing apparatus according to claim 3, wherein
the CPU is further configured to estimate a character of the user based on a basis of chat utterance that is utterance including a chat,
the chat utterance excludes the search utterance and the feedback utterance, and
the generated response is converted based on the estimated character.

6. The information processing apparatus according to claim 1, wherein the search result image further includes an icon that expresses a playlist related to a second feature of the searched music piece.

7. The information processing apparatus according to claim 6, wherein
the CPU is further configured to generate, as a response to the search request, a playlist selection image that expresses the playlist corresponding to a selected icon among a plurality of the icons.

8. The information processing apparatus according to claim 7, wherein the CPU is further configured to generate, as a response to the search request, the playlist selection image that is an image in which at least one feature of the playlist is expressed by a size of a corresponding balloon.

9. The information processing apparatus according to claim 1, wherein the CPU is further configured to:
generate, as the search result, a music piece list that is a list of music pieces, based on the music piece data and the meta information that are included in the search result,
cause reproduction of sound of the music piece data of a music piece instructed to be reproduced from the list of music pieces, and
generate a music piece selection image as a response to the search request, based on the music piece data and the meta information, in a case where any music piece of the music piece list is selected and instructed to be reproduced, wherein the music piece selection image is an image that expresses at least one feature of the music piece instructed to be reproduced.

10. The information processing apparatus according to claim 9, wherein the CPU is further configured to generate, as a response to the search request, the music piece selection image in which the at least one feature of the music piece instructed to be reproduced is expressed by a size of a corresponding balloon, based on the meta information.

11. The information processing apparatus according to claim 9, wherein
the CPU is further configured to generate, as a response to the search request, the at least one feature of the music piece instructed to be reproduced and the music piece selection image, based on the music piece data and the meta information, and
the music piece selection image includes a time-series image in which information that serves as a basis of being searched is displayed in time series.

12. The information processing apparatus according to claim 11, wherein, in the time-series image, the information that serves a basis of being searched is displayed as text or a mark.

13. The information processing apparatus according to claim 9, wherein the CPU is further configured to generate a response to the search request, by expressing the at least one feature of the music piece instructed to be reproduced in time series by light emission or vibration when the music piece is reproduced, based on the music piece data and the meta information.

14. The information processing apparatus according to claim 1, wherein
the meta information of the searched music piece includes at least one of an artist, a music piece title, lyrics, a label, a release time, a genre, tempo, chord progression, a used musical instrument, or information indicating whether or not to be a movie theme song.

15. An information processing method, comprising:
searching for a music piece based on a search request of a user;
generating, as a response to the search request, a search result including each of music piece data of the searched music piece, meta information of the searched music piece, and a search result image, wherein
the search result image is based on the music piece data and the meta information,
the search result image is an image including information regarding a feature of the searched music piece,
the feature is associated with to the search request, and
the search result image expresses the feature by a balloon having a size that corresponds to a ratio of a number of music pieces having the feature to a total number of searched music pieces; and
outputting the generated search result.

16. A non-transitory computer-readable medium having stored thereon, computer-executable instructions which, when executed by a computer, cause the computer to execute operations, the operations comprising:
searching for a music piece based on a search request of a user;
generating, as a response to the search request, a search result including each of music piece data of the searched music piece, meta information of the searched music piece, and a search result image, wherein
the search result image is based on the music piece data and the meta information,
the search result image is an image including information regarding a feature of the searched music piece,
the feature is associated with the search request, and
the search result image expresses the feature by a balloon having a size that corresponds to a ratio of a number of music pieces having the feature to a total number of searched music pieces; and
outputting the generated search result.

* * * * *